(No Model.) 4 Sheets—Sheet 3.
J. W. & G. W. CAMPBELL.
CORN PLANTER.
No. 379,363. Patented Mar. 13, 1888.
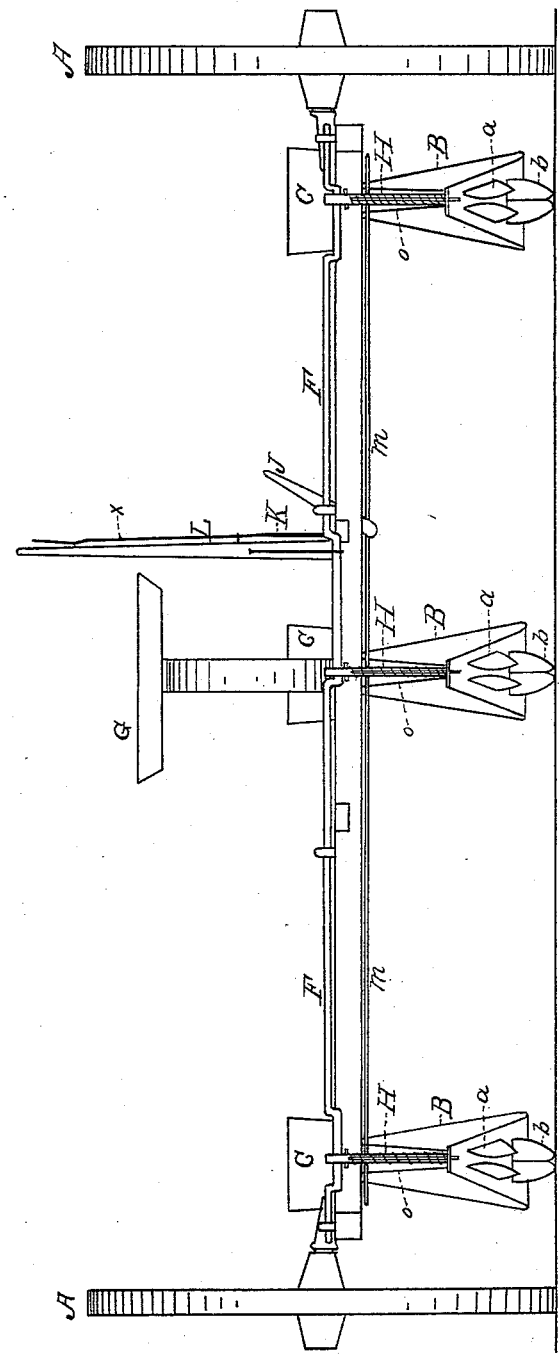

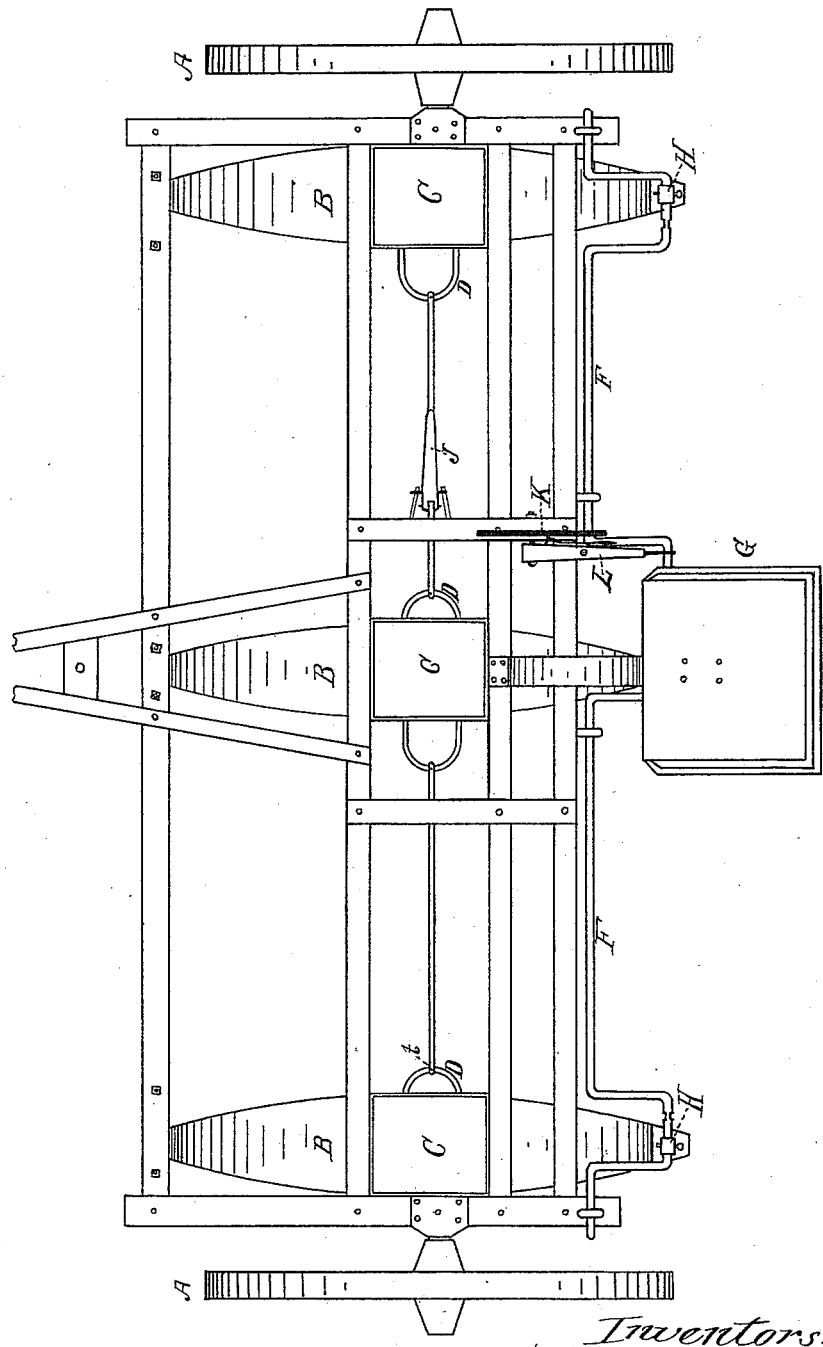

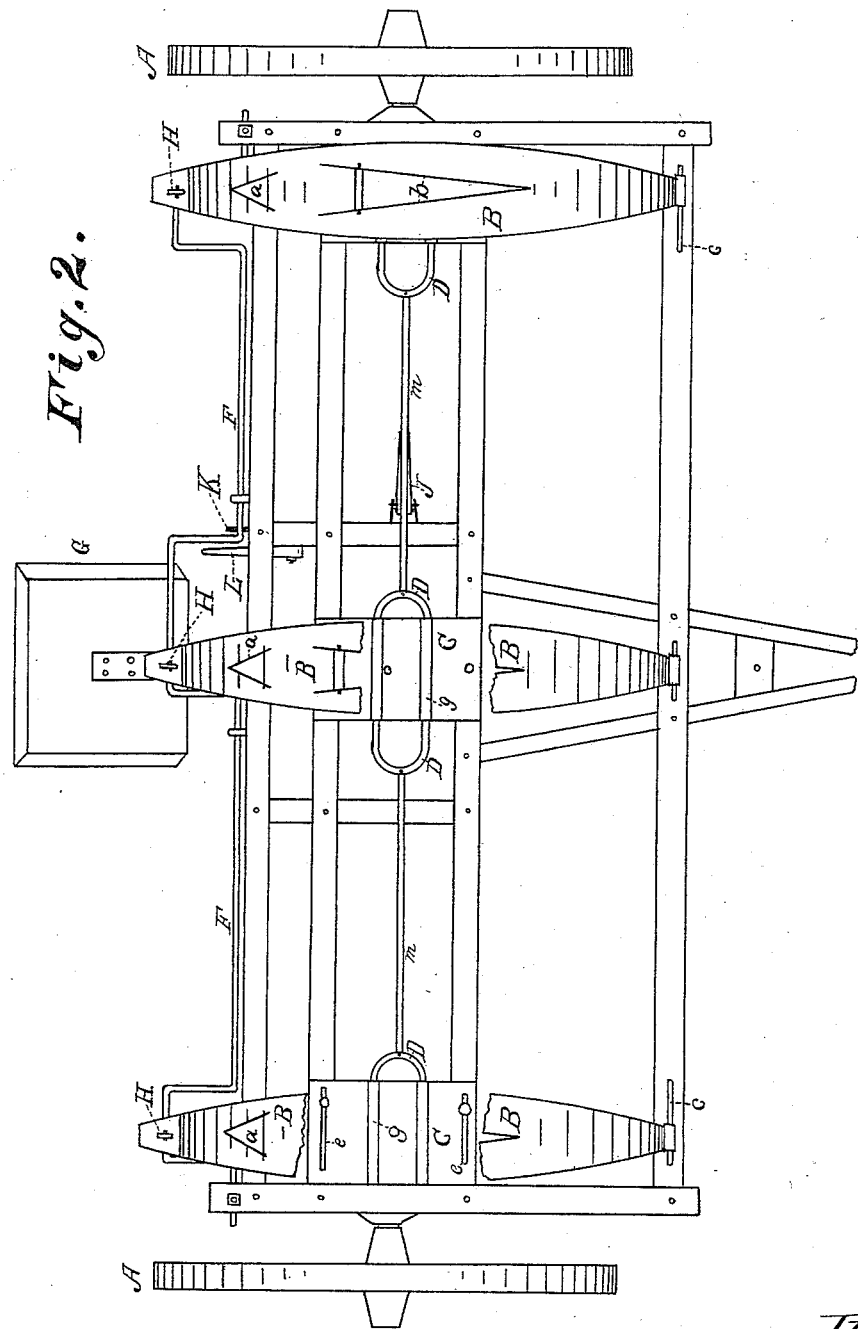

(No Model.) 4 Sheets—Sheet 4.
J. W. & G. W. CAMPBELL.
CORN PLANTER.
No. 379,363. Patented Mar. 13, 1888.
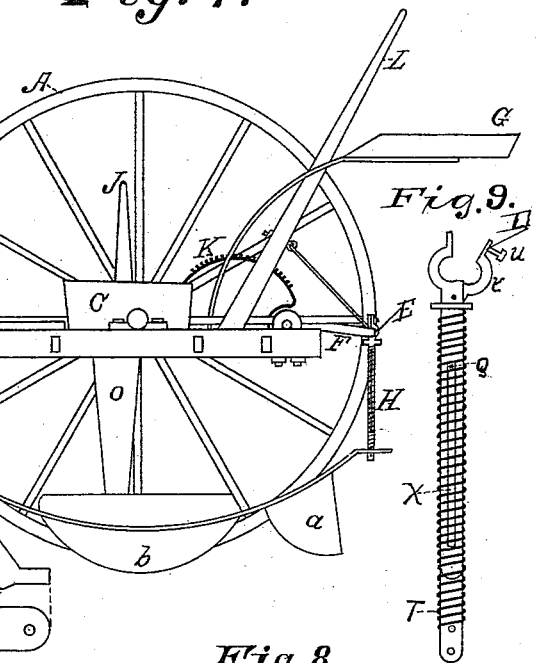
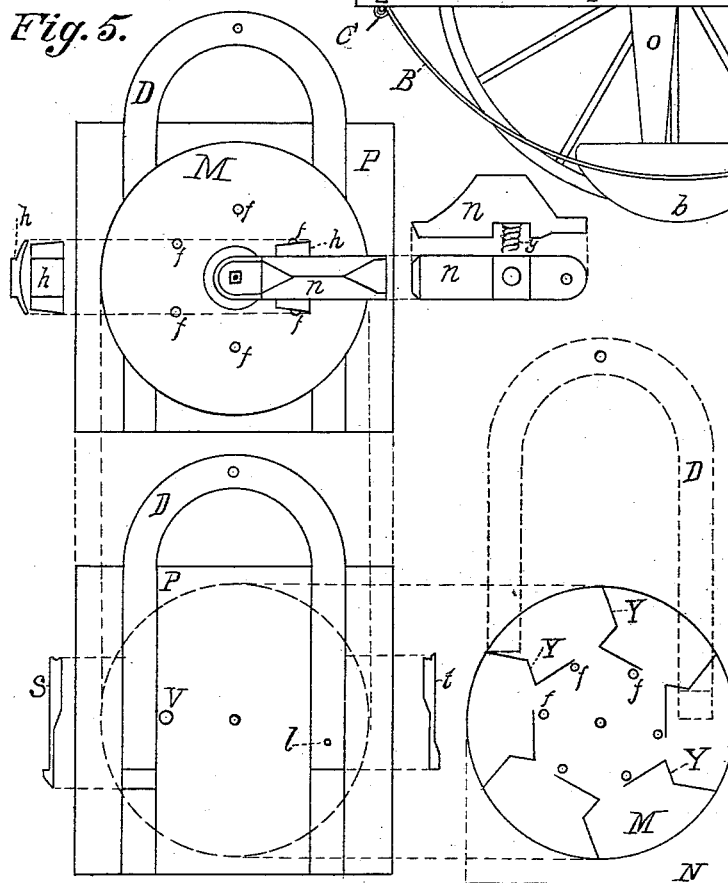
Attest:
W. A. Campbell.
Frank Bland.
Inventors.
Jeremiah W. Campbell
George W. Campbell
per C. D. Campbell, atty

UNITED STATES PATENT OFFICE.

JEREMIAH W. CAMPBELL, OF ST. JOHN'S, AND GEORGE W. CAMPBELL, OF HARROD, OHIO; SAID JEREMIAH W. CAMPBELL ASSIGNOR TO SAID GEORGE W. CAMPBELL.

CORN-PLANTER.

SPECIFICATION forming part of Letters Patent No. 379,363, dated March 13, 1888.

Application filed September 27, 1886. Serial No. 214,707. (No model.)

*To all whom it may concern:*

Be it known that we, JEREMIAH W. CAMPBELL and GEORGE W. CAMPBELL, citizens of the United States, and residents of St. John's and Harrod, in the State of Ohio, have invented a new and useful Improvement in Corn-Planters, of which the following is a specification.

Our invention relates to improvements in corn-planters, and is fully set forth in the following specification and accompanying drawings.

Figure 1 is a top view; Fig. 2, a bottom view; Fig. 3, a rear view; Fig. 4, an end view; Fig. 5, a top view of dropping device; Fig. 6, a bottom view of same; Fig. 7, a bottom view of dropper-plate; Fig. 8, a top view of the board the dropper rests on; Fig. 9, a side view of the slotted spring-piece connecting the rear of our shoe B to the bar F; Fig. 10, an end view of the floor of the dropper, with the spouts attached and the pivoted detaining piece therein.

A A are the main wheel; B B B, shoes pivoted on the front of the frame and attached at their rear by spring adjustment to bar F; C C C, seed-boxes; D, drop-slide; E, hinge by which piece H is attached to bent bar F; F, bar for raising shoes B; G, driver's seat; H, spring-connection between the shoes and lever; J, dropping-lever; K, ratchet in which plunger *x* on handle L engages; L, lever for operating bar F; M, revolving dropper-plate; N, depression or cut-away portion in face of dropper; O, dropper-spout; P, floor or bottom of dropper-box; Q, pin in one part of piece H; R, pivoted detaining piece in drop-spout. S is a dog on end of slide D; T, spring on piece H; V, hole through which seed reaches spout O; Z, interior of spout O; Y, ratchet teeth or shoulders on bottom of plate M; *a*, covering-shovels; *b*, knives or blades in shoe B; *c*, bolts on which fronts of shoes B are pivoted; *e*, slot in which the seed-boxes are adjustable laterally; *f*, holes in the dropper-plate M for corn to drop through; *g*, grooves in which arms of slide D play; *h*, brush or block for cleaning superfluous corn from top of plate; *i*, pin (on end of detainer R) that plays through slot *k*; *l*, hole in arm of slide D in which pin *i* fits; *m*, rod connecting feed-slides; *t*, pawl on end arm of slide; U, bolt in hinge E for fastening connecting-piece H to arm F.

The construction and operation of our devices are as follows:

To bolts on the front of the frame we pivot the shoes B, which pass back and are attached to a spring-connecting piece, H, which is attached at its upper end to the rod F, running along the rear of the machine. These shoes may be made forked at their front ends if desired. Near the middle of its length, and at its lowest point, are two blades, *b*, which extend above and below the shoe B, and are intended to open a furrow to receive the corn. The blades B form a knife-edge at the front, but diverge until (in practice) they are some four inches apart at their rear ends. Just in the rear of these blades are the two shovels *a*, which are some four inches apart at their front, but converge until nearly together at their rear. These shovels are intended to cover the corn. The spring attachment at the rear is made in two pieces, one having a slot in which a pin on the other plays. The object of this is to provide a connection capable of extension or contraction vertically, to allow the shoes to accommodate themselves to irregularities in the ground.

The lever L is attached to rod F in such manner that the operator, by pressing back upon the lever, can force the blades *b* into the ground at will, and the piece H, being surrounded by spring T and being in two pieces connected by the pin Q, playing in slot X, will cause the blades to follow the inequalities in the ground and drop into any holes they may come to. Near the center or toward the rear and passing down between them, nearly to the ground, are the spouts O, which have detaining-pieces R pivoted in them. These pieces R are to catch the seed and detain it, so that it falls from the lower end of the spout to the ground and does not scatter as it would in falling from the top of the spout.

The spouts O are attached to the bottom or floor of the dropper-box, and the corn or seed drops through hole V in the floor into the spout. A pin, $i$, on the upper end of detaining piece or valve R plays through slot $k$ and enters a hole, $l$, in arm $t$ of the slide D. The alternate movements of the slide move the top of piece R to different sides of the spout O, admitting the grain at the top, to be detained by piece R, resting against the side of the spout near the lower end. As the piece R by the next movement of the slide is moved on its pivot, the seed at the bottom is dropped out, and the seed dropping in at the top is caught against the other side of the spout, each alternate movement of the slide and piece R liberating the seed at the bottom and forming a new pocket on the other side. The slides D are operated by rods $m$, which are attached to them by pin $q$ or hook, so as to be easily detachable.

The piece P, to which the spout O is attached, forms the floor to the seed-box, and has the hole V, through which the seed drops. Journaled on this floor is the revolving feed disk or plate M, having holes $f$ therein. On the bottom of this plate are the ratchet-teeth Y, which come over the grooves $g$ as the plate revolves. Playing in these grooves are the pawl T and dog S on the arms of slide D. The distance between the holes $f$ and the extent of the movement of the slide correspond, so that each movement of the slide brings one of the holes $f$ over the hole V in the floor. On top of the plate M, attached to a bolt passing up through its center, is a block, $n$, underneath which and playing in a groove in the same is a brush or block, $h$, which rests on the face of the plate M. In a hole in block $n$ is a coil-spring, $y$, that bears upon the top of the brush $h$, holding it firmly against the face of the plate, but allowing it to yield when necessary. As the plate revolves in the seed-box, the grains of corn drop into the holes $f$, and as the holes pass under the brush $h$ the grains in the holes are carried on, while those on top are brushed back by the piece $h$.

The operation is as follows: As the planter moves forward, the shoes B rest on the ground and the blades $b$ open a furrow for the reception of the seed. A person on the center feed-box moves lever J, operating the slide D, revolving the plates M, and dropping the seed into the spouts O, where they are detained near the bottom by one end of the pivoted piece R resting against the side of the spout. At the next hill the lever is moved in the opposite direction, revolving the plate again, moving the piece R to the other side of the spout, letting the seed fall from the lower end of the spout, and letting a new lot drop into the upper end of the spout. The object of stopping the seed near the bottom of the spout for a time before letting it fall is, that in dropping from the seed-box to the ground (two or three feet) while the planter is in motion the seed is apt to straggle and scatter over quite a distance on the ground. As the seed is dropped in the furrow, the shovels $a$ cover them. Three seed-boxes will usually be mounted on the frame, so that three rows may be planted at one time. It is obvious, however, that a greater or a less number of seed-boxes may be employed.

If it is desired to plant a less number of rows than there are seed-boxes on the planter, the slides D of those boxes from which it is desired that seed shall not fall may be disconnected from the arm $m$, and the operation may be proceeded with as usual.

What we claim is—

In a seed-planter, the combination of the shoe B, having blades $b$ and covering-shovels $a$, pivoted at the forward end of the carriage-frame, a swinging bar, F, at the rear end of the frame, and the herein described improved means for connecting the rear end of the shoe to the bar F, consisting of a slotted split bar having the hinging device E and a bar provided with a pin projecting into the slot of the first-mentioned bar, whereby it is adapted to slide longitudinally in said bar, a coil-spring surrounding and secured upon said bar tending to force the shoe toward the ground, as set forth.

JEREMIAH W. CAMPBELL.
GEORGE W. CAMPBELL.

Witnesses:
ELI FLEMING,
JOHN DOBIE.